(12) United States Patent
Toizumi

(10) Patent No.: US 12,469,263 B2
(45) Date of Patent: Nov. 11, 2025

(54) LEARNING SYSTEM, OBJECT DETECTION SYSTEM, LEARNING METHOD, AND COMPUTER PROGRAM

(71) Applicant: NEC Corporation, Tokyo (JP)

(72) Inventor: Takahiro Toizumi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 375 days.

(21) Appl. No.: 18/016,579

(22) PCT Filed: Jul. 27, 2020

(86) PCT No.: PCT/JP2020/028682
§ 371 (c)(1),
(2) Date: Jan. 17, 2023

(87) PCT Pub. No.: WO2022/024178
PCT Pub. Date: Feb. 3, 2022

(65) Prior Publication Data
US 2023/0316732 A1     Oct. 5, 2023

(51) Int. Cl.
*G06V 10/776* (2022.01)
*G06T 7/11* (2017.01)
*G06V 10/44* (2022.01)

(52) U.S. Cl.
CPC .............. *G06V 10/776* (2022.01); *G06T 7/11* (2017.01); *G06V 10/443* (2022.01); *G06V 2201/02* (2022.01)

(58) Field of Classification Search
CPC .... G06V 10/776; G06V 10/774; G06V 10/44; G06V 10/443; G06V 2201/02;
(Continued)

(56) References Cited

U.S. PATENT DOCUMENTS

2015/0071529 A1\* 3/2015 Yokoi .................. G06V 10/774
    382/159
2015/0324658 A1\* 11/2015 Zhang .................. G06F 18/256
    382/203
(Continued)

FOREIGN PATENT DOCUMENTS

JP      2019-075130 A     5/2019
JP      2020-021111 A     2/2020
(Continued)

OTHER PUBLICATIONS

International Search Report for PCT Application No. PCT/JP2020/028682, mailed on Sep. 8, 2020.

*Primary Examiner* — Oneal R Mistry
*Assistant Examiner* — Duy Tran
(74) *Attorney, Agent, or Firm* — Sughrue Mion, PLLC

(57) ABSTRACT

A learning system includes: an area candidate generation unit that generates an area candidate that is a candidate for an area in which an object is detected from an image; a ground truth area acquisition unit that obtains information about a ground truth area including the object; and a ground truth target generation unit that generates a ground truth target used for learning of an object detection unit that detects the object from the image, on the basis of a score indicating a degree of area matching between the area candidate and the ground truth area and a size of the ground truth area. According to such a learning system, it is possible to properly perform the learning in accordance with the size of the ground truth area.

8 Claims, 13 Drawing Sheets

(58) Field of Classification Search
CPC ...... G06V 10/22; G06V 10/25; G06V 10/255; G06V 10/759; G06V 20/80; G06V 10/422; G06V 20/52; G06V 30/19167; G06V 30/194; G06V 10/778; G06T 7/11; G06T 7/136; G06T 7/223; G06T 2207/20081; G06T 2211/441; G06F 18/22; G06F 18/214; G06F 30/27; G06F 30/20; G06F 3/0484

See application file for complete search history.

(56) References Cited

U.S. PATENT DOCUMENTS

| | | | |
|---|---|---|---|
| 2018/0089505 A1* | 3/2018 | El-Khamy | G06N 3/045 |
| 2019/0130230 A1* | 5/2019 | Kang | G06F 18/2433 |
| 2020/0065989 A1* | 2/2020 | Bai | G06N 3/045 |
| 2020/0279408 A1 | 9/2020 | Osoekawa et al. | |

FOREIGN PATENT DOCUMENTS

| | | |
|---|---|---|
| JP | 2020-060879 A | 4/2020 |
| WO | 2019/092836 A1 | 5/2019 |
| WO | 2019/235050 A1 | 12/2019 |

\* cited by examiner

NORMALIZATION MAP

LEARNING SYSTEM, OBJECT DETECTION SYSTEM, LEARNING METHOD, AND COMPUTER PROGRAM

This application is a National Stage Entry of PCT/JP2020/028682 filed on Jul. 27, 2020, the contents of all of which are incorporated herein by reference, in their entirety.

TECHNICAL FIELD

This disclosure relates to a learning system, an object detection system, a learning method, and a computer program that are related to object detection.

BACKGROUND ART

A system that performs learning of a model used for object detection is known as this type of system. For example, Patent Literature 1 discloses a technique/technology of performing the learning by using a peak position or a peak range in training data. Patent Literature 2 discloses a technique/technology of performing the learning by using an error back propagation method (back propagation). Furthermore, Patent Literature 3 discloses a technique/technology of detecting an object by using IoU (Intersection over Union) indicating a degree of overlap between a candidate area and a ground truth area.

CITATION LIST

Patent Literature

Patent Literature 1: International Publication No. WO2019/092836
Patent Literature 2: JP2020-021111A
Patent Literature 3: International Publication No. WO2019/235050

SUMMARY

Technical Problem

In the object detection using IoU described above, the distribution of IoU varies depending on a difference in size or magnitude of the ground truth area. Specifically, location dependency of IoU is relatively large when the ground truth area is small, while the location dependency of IoU is relatively small when the ground truth area is large. Therefore, it is hard to properly generate a ground truth target used for the learning, without considering the size of the ground truth area. Each cited literature described above does not mention such problems, and there is room for improvement.

In view of the above problems, it is an example object of this disclosure to provide a learning system, an object detection system, a learning method, and a computer program that are configured to solve the problems described above.

Solution to Problem

A learning system according to an example aspect of this disclosure includes: an area candidate generation unit that generates an area candidate that is a candidate for an area in which an object is detected from an image; a ground truth area acquisition unit that obtains information about a ground truth area including the object; and a ground truth target generation unit that generates a ground truth target used for learning of an object detection unit that detects the object from the image, on the basis of a score indicating a degree of area matching between the area candidate and the ground truth area and a size of the ground truth area.

An object detection system according to an example aspect of this disclosure includes: an object detection unit that detects an object from an image; an area candidate generation unit that generates an area candidate that is a candidate for an area in which the object is detected; a ground truth area acquisition unit that obtains information about a ground truth area including the object; and a ground truth target generation unit that generates a ground truth target used for learning of the object detection unit, on the basis of a score indicating a degree of area matching between the area candidate and the ground truth area and a size of the ground truth area.

A learning method according to an example aspect of this disclosure includes: generating an area candidate that is a candidate for an area in which an object is detected from an image; obtaining information about a ground truth area including the object; and generating a ground truth target used for learning of an object detection unit that detects the object from the image, on the basis of a score indicating a degree of area matching between the area candidate and the ground truth area and a size of the ground truth area.

A computer program according to an example aspect of this disclosure operates a computer: to generate an area candidate that is a candidate for an area in which an object is detected from an image; to obtain information about a ground truth area including the object; and to generate a ground truth target used for learning of an object detection unit that detects the object from the image, on the basis of a score indicating a degree of area matching between the area candidate and the ground truth area and a size of the ground truth area.

Effect of the Invention

According to the learning system, the object detection system, the learning method, and the computer program in the respective aspects described above, it is possible to properly generate the ground truth target in accordance with the size of the ground truth area. Consequently, it is possible to perform the learning of the object detection unit, more properly, and to improve accuracy of the object detection.

DESCRIPTION OF EXAMPLE EMBODIMENTS

Hereinafter, a learning system, a learning method, and a computer program according to example embodiments will be described with reference to the drawings.

First Example Embodiment

A learning system according to a first example embodiment will be described with reference to FIG. 1 to FIG. 4.
(Hardware Configuration)

Figure 1:
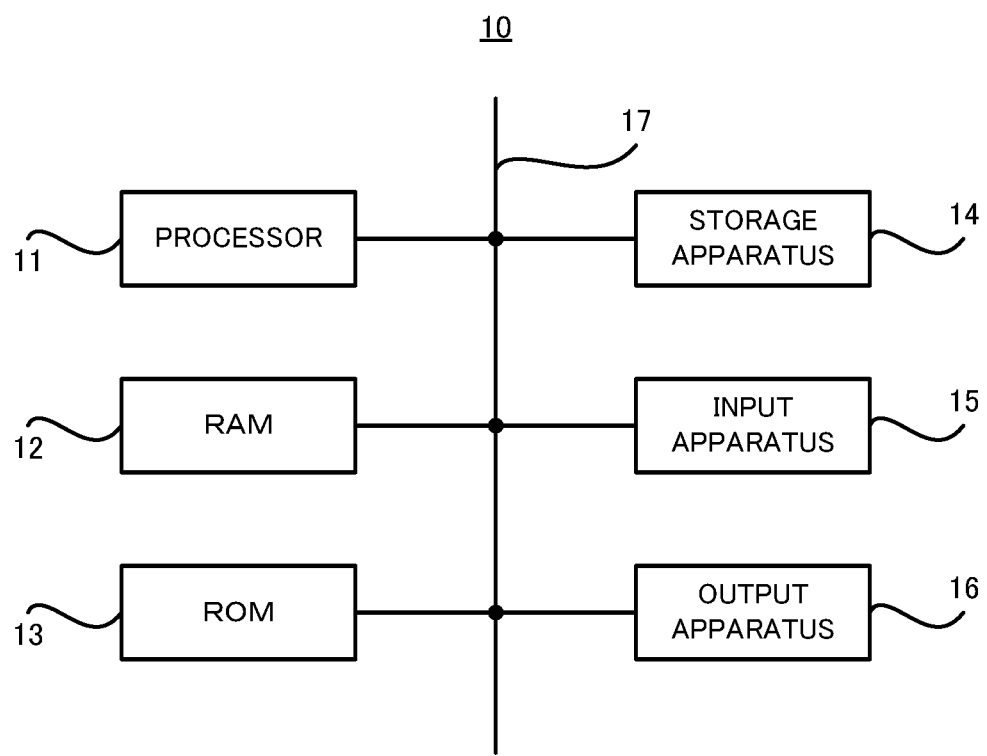
FIG. 1 is a block diagram illustrating a hardware configuration of a learning system according to a first example embodiment.

First, a hardware configuration of a learning system according to the first example embodiment will be described with reference to FIG. 1. FIG. 1 is a block diagram illustrating a hardware configuration of the learning system according to the first example embodiment.

As illustrated in FIG. 1, a learning system 10 according to the first example embodiment includes a processor 11, a RAM (Random Access Memory) 12, a ROM (Read Only Memory) 13, and a storage apparatus 14. The learning system 10 may further include an input apparatus 15 and an output apparatus 16. The processor 11, the RAM 12, the ROM 13, the storage apparatus 14, the input apparatus 15, and the output apparatus 16 are connected through a data bus 17.

The processor 11 reads a computer program. For example, the processor 11 is configured to read a computer program stored by at least one of the RAM 12, the ROM 13 and the storage apparatus 14. Alternatively, the processor 11 may read a computer program stored in a computer readable recording medium, by using a not-illustrated recording medium reading apparatus. The processor 11 may obtain (i.e., read) a computer program from a not-illustrated apparatus disposed outside the learning system 10, through a network interface. The processor 11 controls the RAM 12, the storage apparatus 14, the input apparatus 15, and the output apparatus 16 by executing the read computer program. Especially in this example embodiment, when the processor 11 executes the read computer program, a functional block for generating a ground truth target used for learning is realized or implemented in the processor 11. As the processor 11, one of a CPU (Central Processing Unit), a GPU (Graphics Processing Unit), a FPGA (field-programmable gate array), a DSP (Demand-Side Platform), and am ASIC (Application Specific Integrated Circuit) may be used, or a plurality of them may be used in parallel.

The RAM 12 temporarily stores the computer program to be executed by the processor 11. The RAM 12 temporarily stores the data that are temporarily used by the processor 11 when the processor 11 executes the computer program. The RAM 12 may be, for example, a D-RAM (Dynamic RAM).

The ROM 13 stores a computer program to be executed by the processor 11. The ROM 13 may otherwise store fixed data. The ROM 13 may be, for example, a P-ROM (Programmable ROM).

The storage apparatus 14 stores the data that are stored for a long term by the learning system 10. The storage apparatus 14 may operate as a temporary storage apparatus of the processor 11. The storage apparatus 14 may include, for example, at least one of a hard disk apparatus, a magneto-optical disk apparatus, an SSD (Solid State Drive), and a disk array apparatus.

The input apparatus 15 is an apparatus that receives an input instruction from a user of the learning system 10. The input apparatus 15 may include, for example, at least one of a keyboard, a mouse, and a touch panel.

The output apparatus 16 is an apparatus that outputs information about the learning system 10, to the outside. For example, the output apparatus 16 may be a display apparatus (e.g., a display) that is configured to display the information about the learning system 10.
(Functional Configuration)

Figure 2:
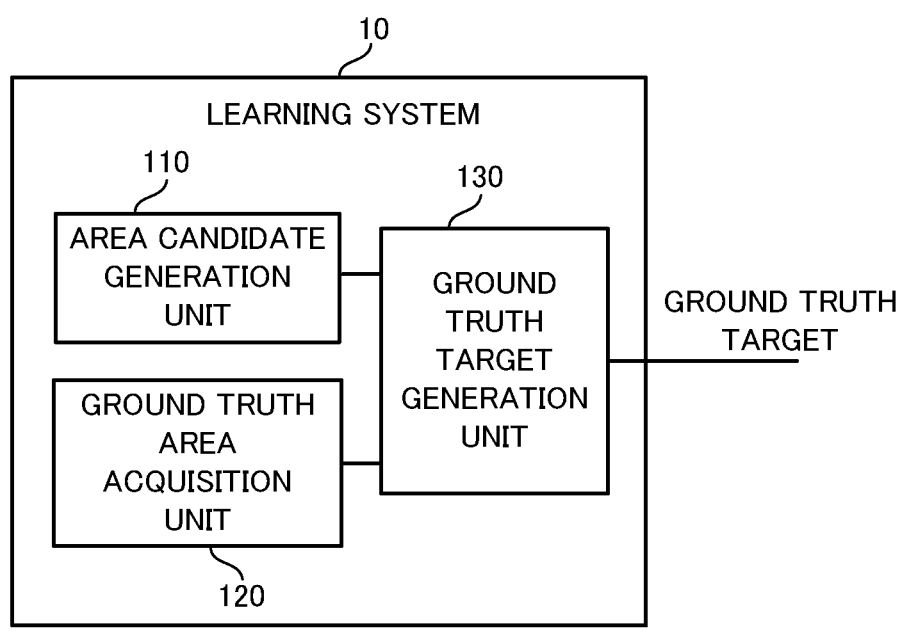
FIG. 2 is a block diagram illustrating a functional configuration of the learning system according to the first example embodiment.

Next, a functional configuration of the learning system 10 according to the first example embodiment will be described with reference to FIG. 2. FIG. 2 is a block diagram illustrating the functional configuration of the learning system according to the first example embodiment;

In FIG. 2, the learning system 10 according to the first example embodiment is configured to generate a ground truth target used for learning of an object detection model (specifically, a model for detecting an object in an image). The ground truth target is information indicating where an object that is a detection target is in an image, and is used as training data for the learning. The learning system 10 includes, as processing blocks for realizing the function, an area candidate generation unit 110, a ground truth area acquisition unit 120, and a ground truth target generation unit 130. The area candidate generation unit 110, the ground truth area acquisition unit 120, and the ground truth target generation unit 130 may be realized or implemented, for example, by the processor 11 (see FIG. 1).

The area candidate generation unit 110 is configured to generate an area candidate (an anchor) that is a candidate of an area in which an object is detected. The area candidate is generated, for example, by determining information about a shape, such as a vertically long rectangle, a horizontally long rectangle, and a square, and information about a size, such as a horizontal width and a vertical width. For example, when there are three types of shapes (a vertically long rectangle, a horizontally long rectangle, and a square) and three types of sizes, the candidate area generation unit 110 generates 3×3=9 types of area candidates. In this case, each area candidate is generated to have four values of upper left xy coordinates and lower right xy coordinates. These area candidates are arranged at even intervals on an image. For example, if the area candidates are arranged at intervals of 8 pixels on an image of 32 pixels×32 pixels, then, 8×8 area candidates are arranged on pixels of (4, 8, 12, 16, 20, 24, 28, 32). The area candidates are expressed in four dimensions of (number of types, number in a vertical direction, number in a horizontal direction, and coordinate number), and in this case, the area candidates are in four dimensions of (9, 8, 8, 4). Information about the area candidate is configured to be outputted to the ground truth target generation unit 130.

The ground truth area acquisition unit 120 is configured to obtain information about a ground truth area used for learning (i.e., an area actually including the object that is a detection target). The ground truth area acquisition unit 120 obtains at least information about a size of the ground truth area. The information about the ground truth area is configured to be outputted to the ground truth target generation unit 130.

The ground truth target generation unit 130 is configured to generate a ground truth target on the basis of the information about the area candidate generated by the area candidate generation unit 110 and the information about the ground truth area obtained by the ground truth area acquisition unit 120. Specifically, the ground truth target generation unit 130 generates the ground truth target, on the basis of a score (e.g., IoU) indicating a degree of matching between the area candidate and the ground truth area, and the size of the ground truth target. A more specific method of generating the ground truth target will be described in another example embodiment described later. The ground truth target generation unit 130 may have a function of outputting the generated ground truth target.

Modified Example

Figure 3:
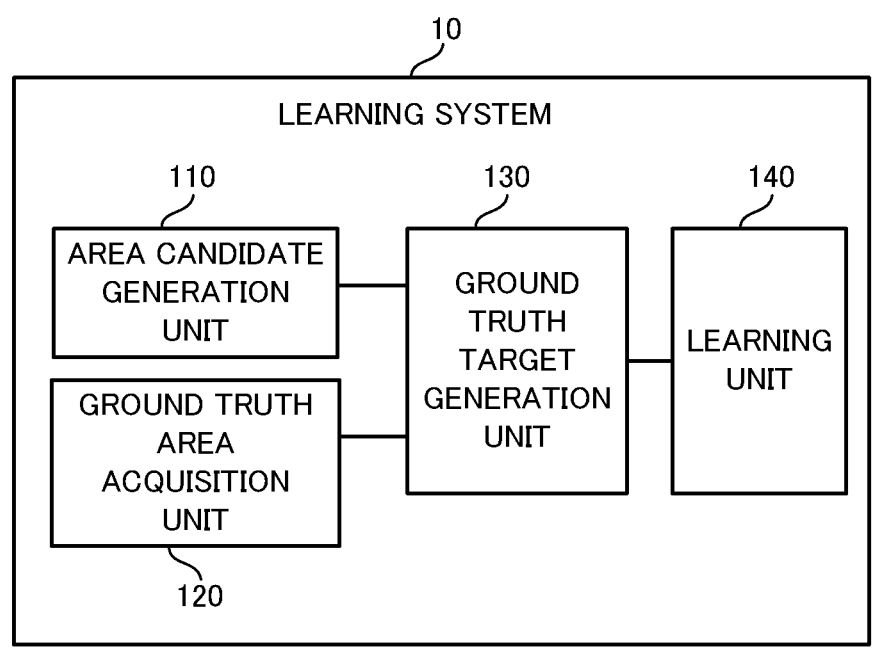
FIG. 3 is a block diagram illustrating a functional configuration of a learning system according to a modified example of the first example embodiment.

Here, with reference to FIG. 3, the learning system 10 according to a modified example of the first example embodiment will be described. FIG. 3 is a block diagram illustrating a functional configuration of the learning system according to the modified example of the first example embodiment. In FIG. 3, the same components as those illustrated in FIG. 2 carry the same reference numerals.

As illustrated in FIG. 3, the learning system 10 according to the modified example includes, as processing blocks for realizing the function, the area candidate generation unit 110, the ground truth area acquisition unit 120, the ground truth target generation unit 130, and a learning unit 140. That is, the learning system 10 according to the modified example further includes the learning unit 140 in addition to the configuration in FIG. 2 already described. The learning unit 140 may be realized or implemented, for example, by the processor 11 (see FIG. 1).

The learning unit 140 is configured to perform the learning of the object detection model by using the ground truth target generated by the ground truth target generation unit 130. For example, the learning unit 140 extracts an image feature map (i.e., a map of a feature quantity of an image) from an image and calculates an estimated area candidate and an estimated area deviation from the image feature map. Subsequently, the learning unit 140 calculates an error function by calculating a difference from the ground truth target for the estimated area candidate and the estimated area deviation. For example, it is possible to use an L1 distance, a binary cross entropy, or the like to calculate the difference from the ground truth target. The learning unit 140 calculates a gradient of a parameter by the error back propagation, by using the calculated error function. Then, the learning unit 140 updates the parameter of the object detection model by using the calculated gradient. A method of updating the parameter is not particularly limited, but, for example, a method such as SGD (Stochastic Gradient Descent) and Adam can be used. The above-described learning method is merely an example, and the learning unit 140 is allowed to properly adopt the existing techniques/technologies to perform the learning.

(Flow of Operation)

Figure 4:
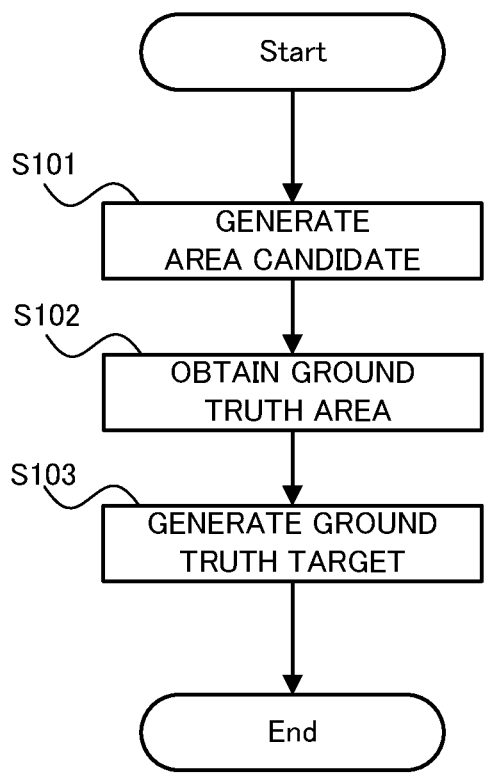
FIG. 4 is a flowchart illustrating a flow of operation of the learning system according to the first example embodiment.

Next, a flow of operation of the learning system 10 according to the first example embodiment will be described with reference to FIG. 4. FIG. 4 is a flowchart illustrating the flow of the operation of the learning system according to the first example embodiment.

As illustrated in FIG. 4, in operation of the learning system 10 according to the first example embodiment, first, the area candidate generation unit 110 generates the area candidate (step S101). Then, the ground truth area acquisition unit 120 obtains the information about the ground truth area (step S102). The order of the steps S101 and S102 may be executed interchangeably.

Then, the ground truth target generation unit 130 generates the ground truth target (step S103). As already described, the ground truth target generation unit 130 generates the ground truth target, on the basis of the score indicating the degree of matching between the area candidate and the ground truth area, and the size of the ground truth area. When the learning system 10 includes the learning unit 140 as in the modified example described above (see FIG. 3), the learning unit 140 may perform the learning of the object detection model by using the generated ground truth target after the ground truth target is generated.

Technical Effect

Next, a technical effect obtained by the learning system 10 according to the first example embodiment will be described.

As described in FIG. 1 to FIG. 4, in the learning system 10 according to the first example embodiment, when the ground truth target is generated, the score indicating the degree of matching between the area candidate and the ground truth area and the size of the ground truth area are considered. Here, in particular, the location dependency of the score indicating the degree of matching between the area candidate and the ground truth area varies depending on the size of the ground truth area. Specifically, the location dependency of the score is relatively large when the ground truth area is small, while the location dependency of the score is relatively small when the ground truth area is large. Therefore, it is hard to properly generate the ground truth target from the score without considering the size of the ground truth area. In the first example embodiment, however, as described above, the size of the ground truth area is considered, and it is thus possible to properly generate the ground truth target.

Second Example Embodiment

The learning system 10 according to a second example embodiment will be described with reference to FIG. 5 and FIG. 6. The second example embodiment is partially different from the first example embodiment described above only in configuration and operation, and may be the same as the first example embodiment in other parts (e.g., hardware configuration illustrated in FIG. 1, etc.). Therefore, in the following, the parts that differ from the first example embodiment will be described in detail below, and a description of the overlapping parts will be omitted as appropriate.

(Functional Configuration)

First, a functional configuration of the learning system 10 according to the second example embodiment will be described with reference to FIG. 5. FIG. 5 is a block diagram illustrating the functional configuration of the learning system according to the second example embodiment. In FIG. 5, the same components as those illustrated in FIG. 2 carry the same reference numerals.

Figure 5:
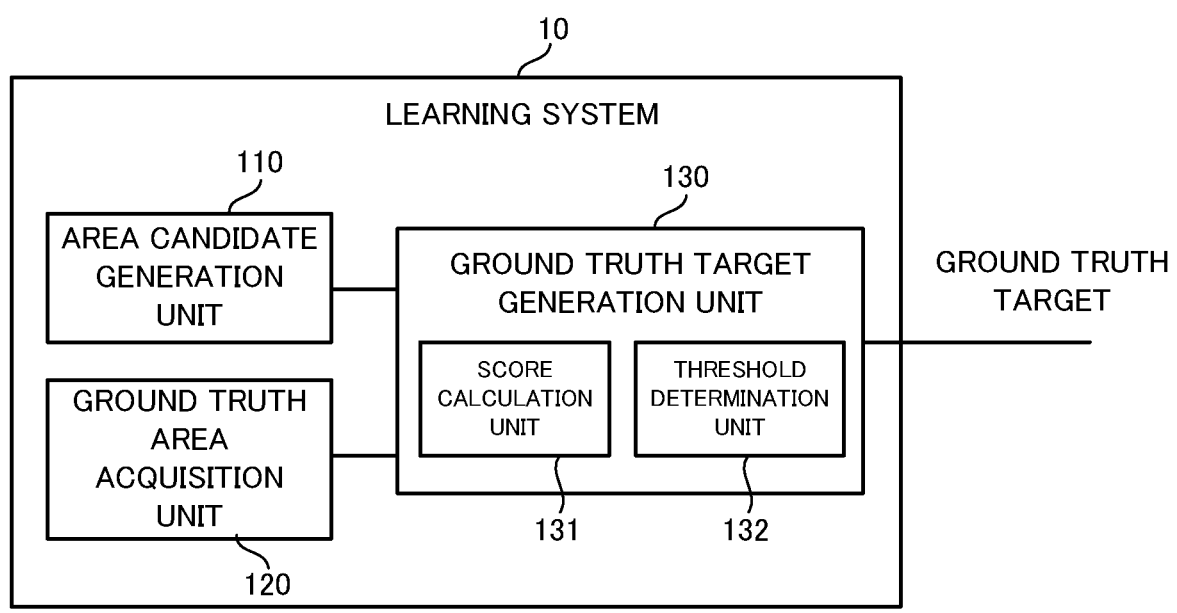
FIG. 5 is a block diagram illustrating a functional configuration of a learning system according to a second example embodiment.

As illustrated in FIG. 5, the learning system 10 according to the second example embodiment includes, as processing blocks for realizing the function, the area candidate generation unit 110, the ground truth area acquisition unit 120, and the ground truth target generation unit 130. In particular, the ground truth target generation unit 130 according to the second example embodiment includes a score calculation unit 131 and a threshold determination unit 132.

The score calculation unit 131 is configured to calculate the score indicating the degree of matching between the area candidate generated by the area candidate generation unit 110 and the ground truth area. The score calculation unit 131 performs the calculation on all the area candidates generated by the area candidate generation unit 110. Therefore, the score outputted from the score calculation unit 131 is expressed in three dimensions of (number of types×number in a vertical direction×number in a horizontal direction).

The threshold determination unit 132 uses the score calculated by the score calculation unit 131 as an input, and outputs a binary map of a size of (number of types×number in a vertical direction×number in a horizontal direction) with a value of "0" or "1" in a threshold process (i.e., a process in which the score is compared with a threshold). This binary map is the ground truth target used for the learning of the object detection model. That is, the threshold determination unit 132 has a function of generating the ground truth target from the score. Furthermore, the threshold determination unit 132 is configured to generate the threshold used for the threshold process. The threshold determination unit 132 generates the threshold on the basis of the size of the ground truth area. Specifically, the threshold determination unit 132 relatively increases a range of the threshold when the ground truth area is large, while the threshold determination unit 132 relatively reduces the range of the threshold when the ground truth area is small. The threshold determination unit 132 may determine the threshold by a random number within a range that is determined in accordance with the size of the ground truth area. The distribution of the random number in this case is not particularly limited, but it may be, for example, a uniform random number, or a Gaussian distribution.

(Flow of Operation)

Next, a flow of operation of the learning system 10 according to the second example embodiment will be described with reference to FIG. 6. FIG. 6 is a flowchart illustrating the flow of the operation of the learning system according to the second example embodiment. In FIG. 6, the same steps as those illustrated in FIG. 4 carry the same reference numerals.

Figure 6:
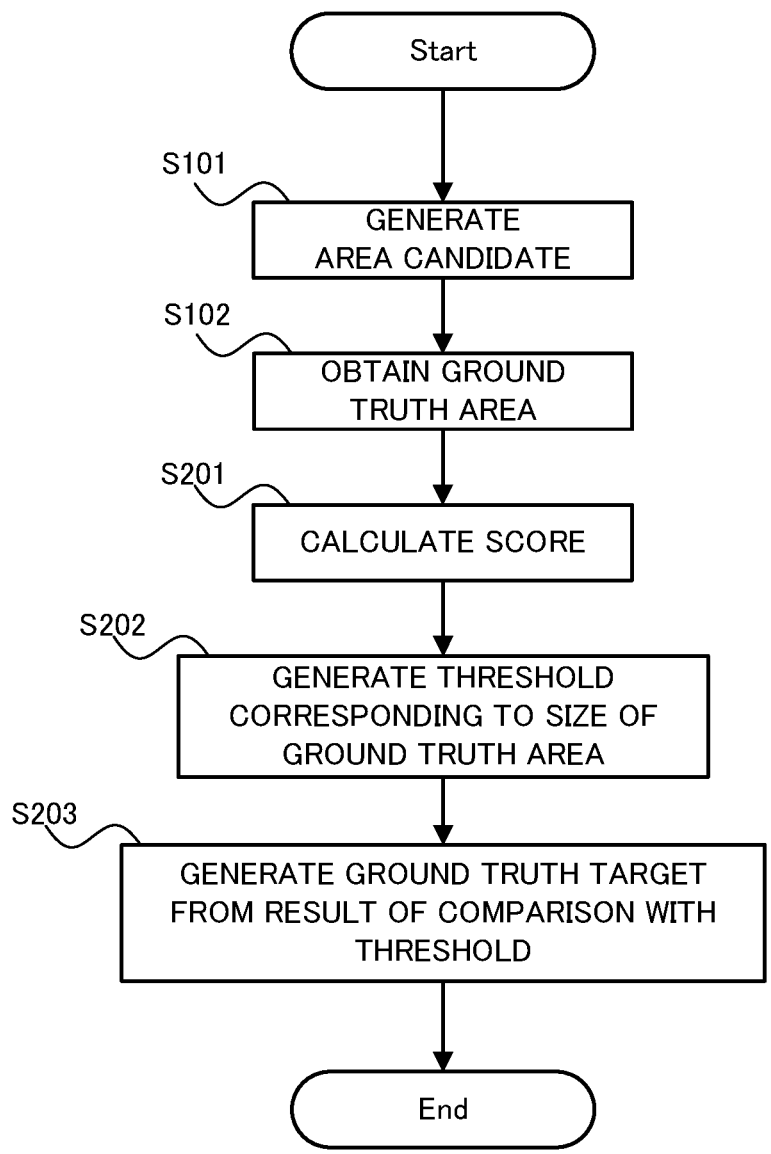
FIG. 6 is a flowchart illustrating a flow of operation of the learning system according to the second example embodiment.

As illustrated in FIG. 6, in operation of the learning system 10 according to the second example embodiment, first, the area candidate generation unit 110 generates the area candidate (the step S101). Then, the ground truth area acquisition unit 120 obtains the information about the ground truth area (the step S102).

Then, the score calculation unit 131 calculates the score indicating the degree of matching between the area candidate and the ground truth area (step S201). Subsequently, the threshold determination unit 132 generates the threshold corresponding to the size of the ground truth area (step S202). The threshold determination unit 132 further generates the ground truth target by comparing the score and the threshold (step S203).

Technical Effect

Next, a technical effect obtained by the learning system 10 according to the second example embodiment will be described.

As described in FIG. 5 and FIG. 6, in the learning system 10 according to the second example embodiment, the threshold for the score is generated on the basis of the size of the ground truth area. In other words, the threshold is changed in accordance with the size of the ground truth area. In this way, it is possible to properly generate the ground truth target in consideration of the size of the ground truth area. Specifically, it is possible to generate the ground truth target while accurately detecting a small area, but not detecting a large area too much.

Third Example Embodiment

The learning system 10 according to a third example embodiment will be described with reference to FIG. 7 to FIG. 9. The third example embodiment is partially different from the first and second example embodiments described above only in configuration and operation, and may be the same as the first and second example embodiments in other parts (e.g., hardware configuration illustrated in FIG. 1, etc.). Therefore, in the following, the parts that differ from the already-described parts will be described in detail below, and a description of the overlapping parts will be omitted as appropriate.

(Functional Configuration)

First, a functional configuration of the learning system 10 according to the third example embodiment will be described with reference to FIG. 7. FIG. 7 is a block diagram illustrating the functional configuration of the learning system according to the third example embodiment. In FIG. 7, the same components as those illustrated in FIG. 2 and FIG. 5 carry the same reference numerals.

Figure 7:
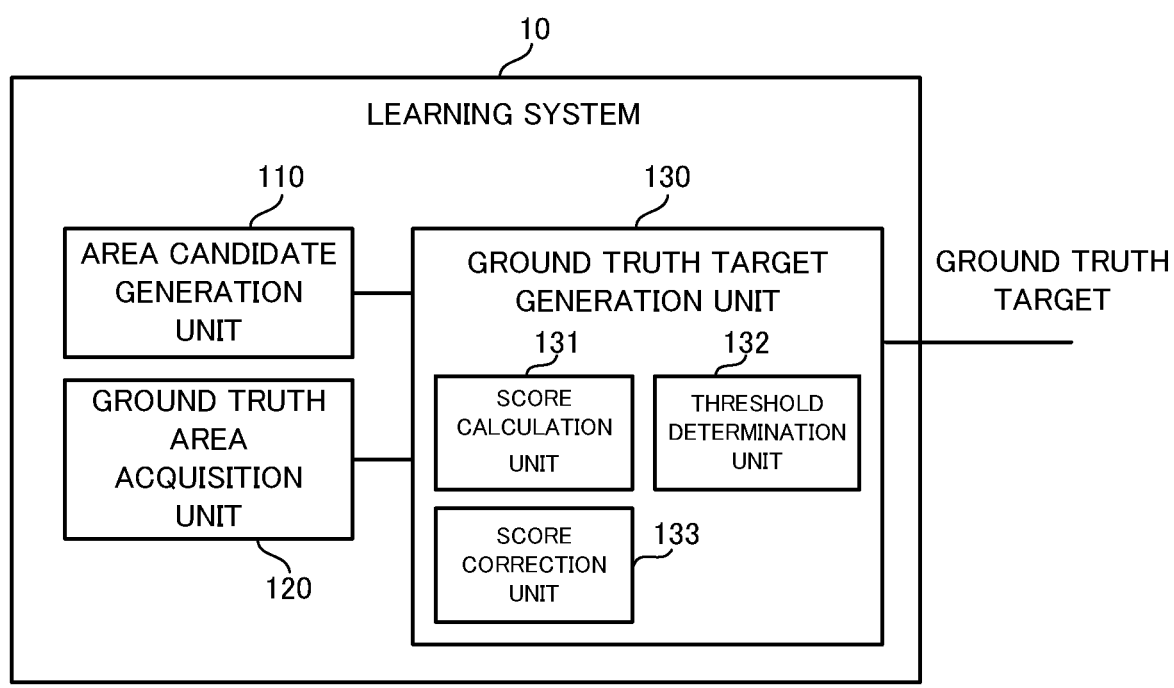
FIG. 7 is a block diagram illustrating a functional configuration of a learning system according to a third example embodiment.

As illustrated in FIG. 7, the learning system 10 according to the third example embodiment includes, as processing blocks for realizing the function, the area candidate generation unit 110, the ground truth area acquisition unit 120, and the ground truth target generation unit 130.

In particular, the ground truth target generation unit 130 according to the third example embodiment includes the score calculation unit 131, the threshold determination unit 132, and a score correction unit 133. That is, the ground truth target generation unit 130 according to the third example embodiment further includes the score correction unit 133 in addition to the configuration in the second example embodiment (see FIG. 5).

The score correction unit 133 is configured to correct the score calculated by the score calculation unit 131. More specifically, the score correction unit 133 is configured to correct the score calculated by the score calculation unit 131 and then output it to the threshold determination unit 132. Therefore, in the threshold determination unit 132, the threshold process (i.e., generation of the ground truth target) is performed by using the score corrected by the score correction unit 133. The score correction unit 133 performs the correction so as to reduce the location dependency of the score. More specifically, the score correction unit 133 performs the correction so as to increase the score as the ground truth area is smaller.

(Flow of Operation)

Next, a flow of operation of the learning system 10 according to the third example embodiment will be described with reference to FIG. 8. FIG. 8 is a flowchart illustrating the flow of the operation of the learning system according to the third example embodiment. In FIG. 8, the same steps as those illustrated in FIG. 4 and FIG. 6 carry the same reference numerals.

Figure 8:
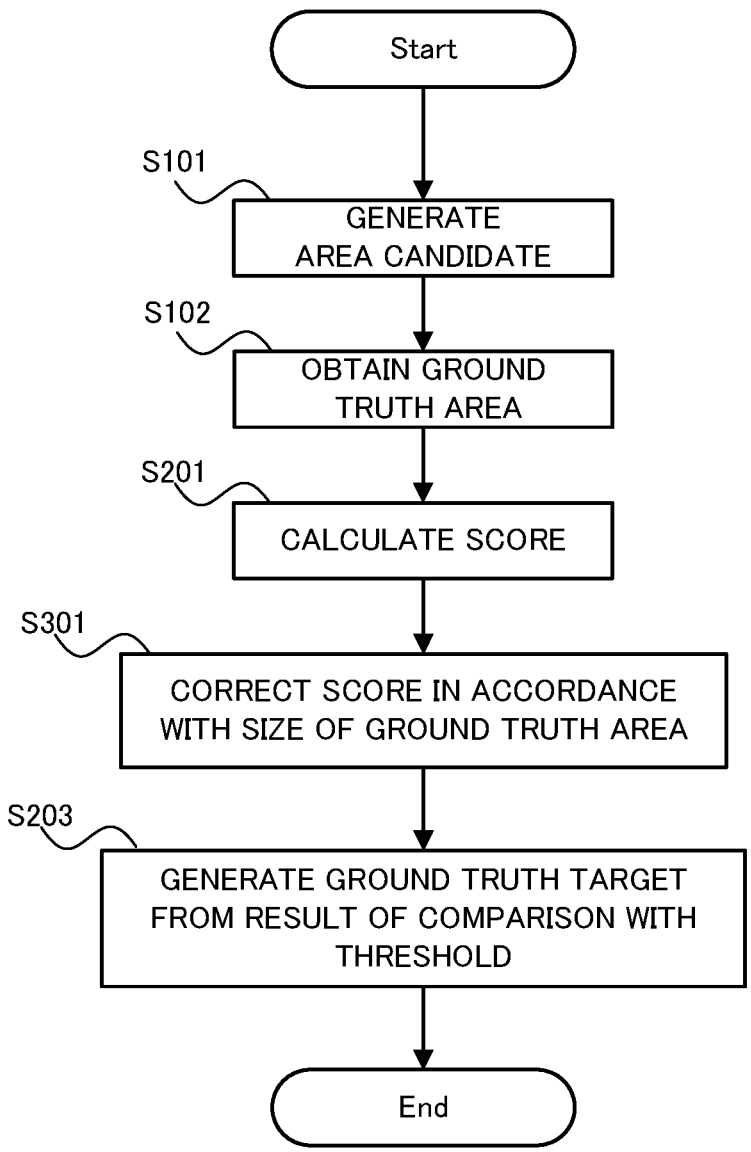
FIG. 8 is a flowchart illustrating a flow of operation of the learning system according to the third example embodiment.

As illustrated in FIG. 8, in operation of the learning system 10 according to the third example embodiment, first, the area candidate generation unit 110 generates the area candidate (the step S101). Then, the ground truth area acquisition unit 120 obtains the information about the ground truth area (the step S102).

Then, the score calculation unit 131 calculates the score indicating the degree of matching between the area candidate and the ground truth area (the step S201). Subsequently, the score correction unit 133 corrects the score calculated by score calculation unit 131 (step S301). Then, the threshold determination unit 132 generates the ground truth target by using the score corrected by the score correction unit 133 (the step S203). Unlike the second example embodiment, the threshold determination unit 132 according to the third example embodiment may not change the threshold in accordance with the size of the ground truth area.

(Normalization Map)

Next, a normalization map that is available in the learning system 10 according to the third example embodiment will be described with reference to FIG. 9. FIG. 9 is a diagram illustrating an example of the normalization map.

Figure 9:
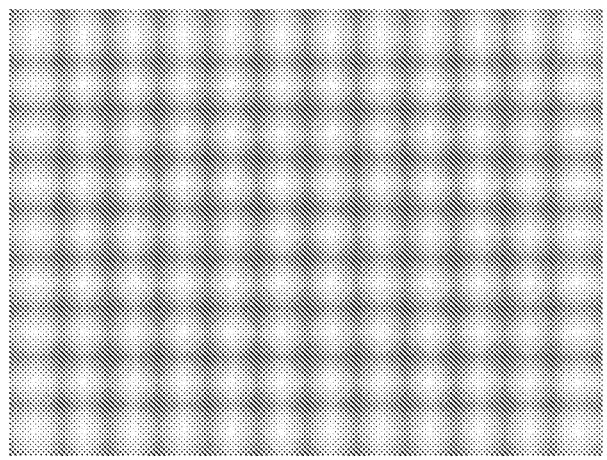
FIG. 9 is a diagram illustrating an example of a normalization map.

In FIG. 9, the score correction unit 133 may correct the score by using a normalization map generated in advance. The normalization map is a map with a higher score in a position that is closer to a center position of the area candidate and with a lower score in a groove of each area candidate. The normalization map may be generated by calculating the score for the area candidate that is the closest from a current pixel, for example, by Sliding window or the like.

The score correction unit 133 stores the above-described normalization map and performs a process of dividing the score calculated by the score calculation unit 131 (to be exact, a map of the score) by the normalization map. Then, a score obtained as a calculation result (i.e., a normalized score) is outputted to the threshold determination unit 132.

Technical Effect

Next, a technical effect obtained by the learning system 10 according to the third example embodiment will be described.

As described in FIG. 7 to FIG. 9, in the learning system 10 according to the third example embodiment, the score is corrected by the score correction unit 133. Such a process makes it possible to reduce the location dependency of the score caused by the size of the ground truth area. It is thus possible to properly generate the ground truth target by the threshold process that uses the score.

The configuration of correcting the score in the third example embodiment may also be combined with the configuration of changing the threshold in the second example embodiment. That is, the score correction unit 133 may correct the score in accordance with the size of the ground truth area, and in the subsequent threshold process, the threshold determination unit 132 may change the threshold in accordance with the size of the ground truth area.

Fourth Example Embodiment

The learning system 10 according to a fourth example embodiment will be described with reference to FIG. 10.

The fourth example embodiment is partially different from the second and third example embodiments described above only in operation, and may be the same as the second and third example embodiments in hardware configuration (see FIG. 1) and functional configuration (see FIG. 5 and FIG. 7). Therefore, in the following, the parts that differ from the already-described parts will be described in detail below, and a description of the overlapping parts will be omitted as appropriate.

(Flow of Operation)

First, a flow of operation of the learning system 10 according to the fourth example embodiment will be described with reference to FIG. 10. FIG. 10 is a flowchart illustrating the flow of the operation of the learning system according to the fourth example embodiment. In FIG. 8, the same steps as those illustrated in FIG. 4, FIG. 6 and FIG. 8 carry the same reference numerals.

As illustrated in FIG. 8, in operation of the learning system 10 according to the fourth example embodiment, first, the area candidate generation unit 110 generates the area candidate (the step S101). Then, the ground truth area acquisition unit 120 obtains the information about the ground truth area (the step S102).

The score calculation unit 131 then calculates the score indicating the degree of matching between the area candidate and the ground truth area, wherein the score calculation unit 131 moves the center position of the area candidate by a random number in accordance with the size of the ground truth area (step S401). The score calculation unit 131 moves the center position of the area candidate by a random number in a relatively small range when the ground truth area is large. On the other hand, the score calculation unit 131 moves the center position of the area candidate by a random number in a relatively large range when the ground truth area is small. The distribution of the random number is not particularly limited, but it may be, for example, a uniform random number, or a Gaussian distribution.

Then, the threshold determination unit 132 generates the ground truth target by using the calculated score (the step S203). Unlike the second example embodiment, the threshold determination unit 132 according to the fourth example embodiment may not change the threshold in accordance with the size of the ground truth area.

Technical Effect

Next, a technical effect obtained by the learning system 10 according to the fourth example embodiment will be described.

Figure 10:
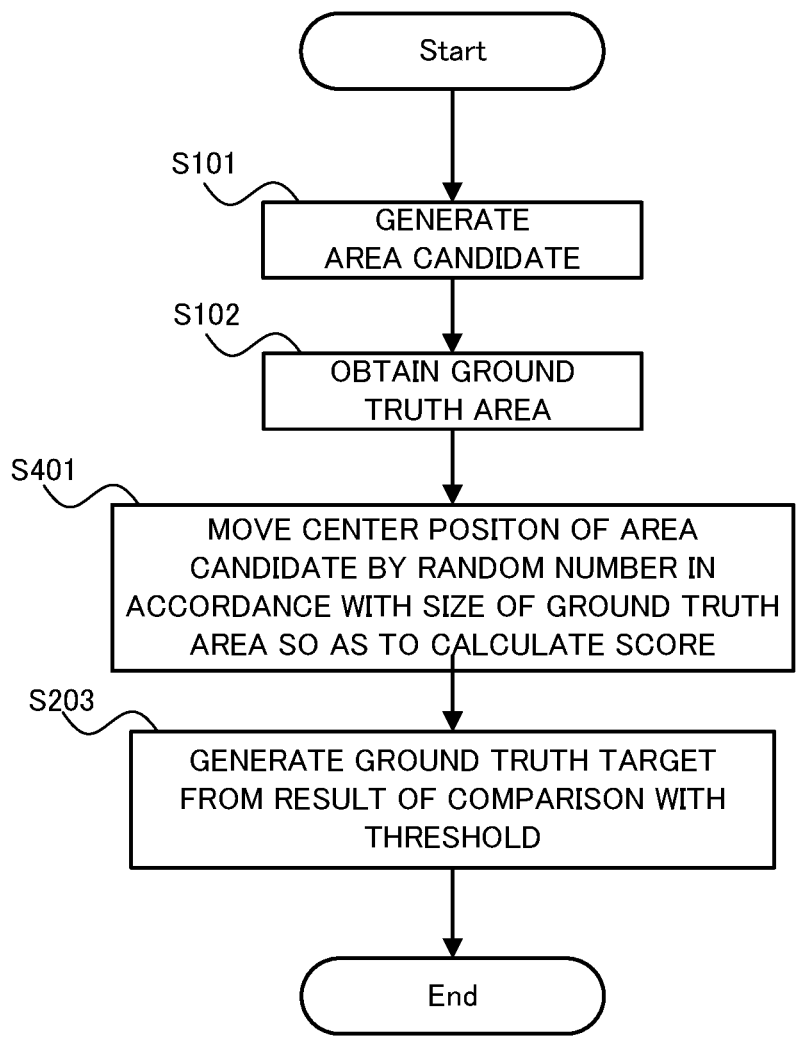
FIG. 10 is a flowchart illustrating a flow of operation of a learning system according to a fourth example embodiment.

As described in FIG. 10, in the learning system 10 according to the fourth example embodiment, when the score is calculated, the position of the area candidate is moved by a random number in accordance with the size of the ground truth area. When the position of the area candidate is fixed, a gap appears between the area candidates. The gap can be filled if the center position of the area candidate is moved by a random number as described above. As a consequence, it is possible to prevent omission of detection when the ground truth area is small. Therefore, it is possible to properly generate the ground truth target.

The configuration of moving the center position of the area candidate by a random number in the fourth example embodiment may be combined with at least one of the configuration of changing the threshold in the second example embodiment and the configuration of correcting the score in the third example embodiment. That is, the score correction unit 133 may calculate the score by moving the center position of the area candidate by a random number in accordance with the size of the ground truth area. Alternatively, the score may be calculated by moving the center position of the area candidate by a random number, and in the subsequent threshold process, the threshold determination unit 132 may change the threshold in accordance with the size of the ground truth area.

Fifth Example Embodiment

An object detection system 20 according to a fifth example embodiment will be described with reference to FIG. 11 to FIG. 13. The fifth example embodiment may be the same as the first to fourth example embodiments described above in hardware configuration (see FIG. 1). Furthermore, as the component for learning the object detection model, the fifth example embodiment may include the same component as that in the first to fourth example embodiments described above. In the following, a description of the parts that overlap the description of the first to the fourth example embodiments (i.e., the configuration and operation for performing the learning) will be omitted as appropriate, and the configuration and operation for detecting the object will be described in detail.

(Functional Configuration)

First, a functional configuration of the object detection system 20 according to the fifth example embodiment will be described with reference to FIG. 11. FIG. 11 is a block diagram illustrating the functional configuration of the object detection system according to the fifth example embodiment. In FIG. 11, the same components as those illustrated in FIG. 2 and FIG. 4 carry the same reference numerals.

Figure 11:
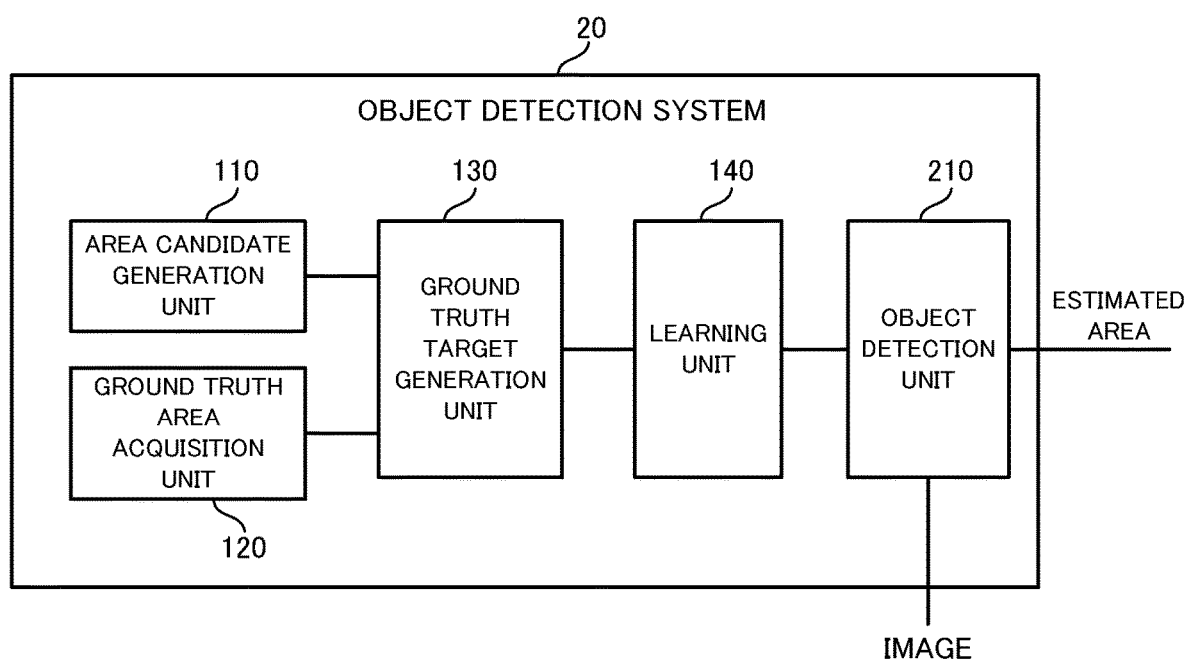
FIG. 11 is a block diagram illustrating a functional configuration of an object detection system according to a fifth example embodiment.

As illustrated in FIG. 11, the object detection system 20 according to the fifth example embodiment includes, as processing blocks for realizing the function, the area candidate generation unit 110, the ground truth area acquisition unit 120, the ground truth target generation unit 130, the learning unit 140, and an object detection unit 210. That is, the object detection system 20 according to the fifth example embodiment further includes the object detection unit 210 in addition to the configuration in FIG. 4 already described. The object detection unit 210 may be realized or implemented, for example, by the processor 11 (see FIG. 1).

The object detection system 20 may be configured to include a part or all of the components other than the object detection unit 210 (in other words, the configuration used for the learning of the object detection model), outside the system. For example, the area candidate generation unit 110, the ground truth area acquisition unit 120, the ground truth target generation unit 130, and the learning unit 140 may be provided in a server or the like outside the system. In this case, the object detection system 20 may be configured to read the object detection model learned by the learning unit 140 from the external server.

The object detection unit 210 is configured to estimate an area including the object that is a detection target, from an input image. The object detection unit 210 detects the object by using the object detection model learned by the learning system 10 according to the first to fourth example embodiments described above. The object detection unit 210 may have, for example, a function of extracting a map of the feature quantity from the image and of generating a map of distribution of the area candidate and a map of the area deviation. In this case, the object detection unit 210 may estimate the area including the object, from the map of the distribution of the area candidate and from the map of the area deviation. The object detection unit 210 may have a function of reducing or attenuating the number of areas when many areas are estimated. For the reduction or attenuation of the number of the areas, for example, NMS(Non-Maximum Suppression) may be used.

(Flow of Operation)

Next, a flow of operation of the object detection system 20 according to the fifth example embodiment will be described with reference to FIG. 12. FIG. 12 is a flowchart illustrating the flow of the operation of the learning system according to the fifth example embodiment.

Figure 12:
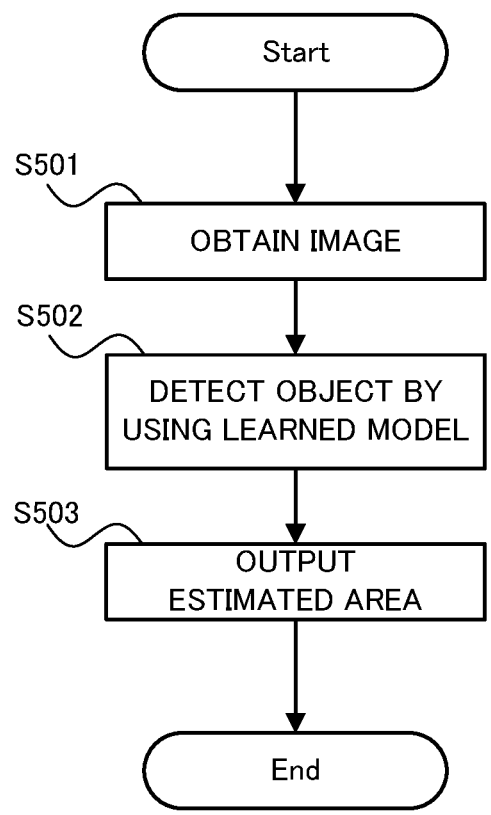
FIG. 12 is a flowchart illustrating a flow of operation of the object detection system according to the fifth example embodiment.

As illustrated in FIG. 12, in operation of the object detection system 10 according to the fifth example embodiment, first, the object detection unit 210 obtains an image that is a detection target (step S501).

Subsequently, the object detection unit 210 detects an object in the image by using the learned object detecting model (step S502). As a detection result, the object detection unit 210 outputs an area including the object, as an estimated area (step S503).

Specific Detection Example

Next, a specific detection example of the object detection system 20 according to the fifth example embodiment will be described with reference to FIG. 13. FIG. 13 is a diagram illustrating an operation example of the object detection system according to the fifth example embodiment.

Figure 13:
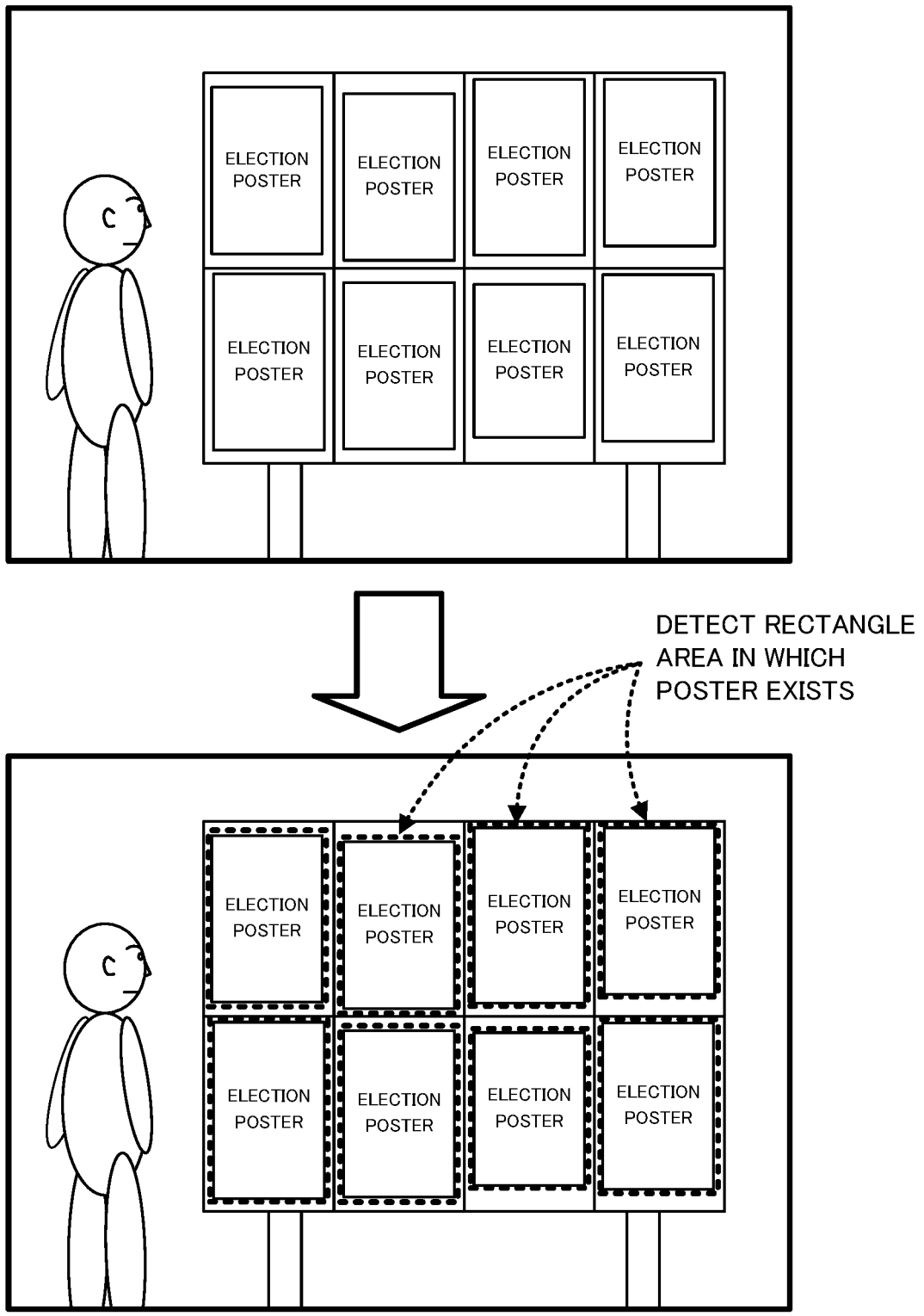
FIG. 13 is a diagram illustrating an operation example of the object detection system according to the fifth example embodiment.

In the example illustrated in FIG. 13, an image includes a plurality of election posters that are detection targets. Since the election poster includes information on politics and elections, for example, a broadcasting industry may require a work of deleting the information from video. According to the object detection system 20 in the fifth example embodiment, it is possible to easily and accurately detect an object to be deleted (hereinafter referred to as an "inappropriate display" as appropriate). Specifically, when the image illustrated in FIG. 13 is inputted to the object detection system 20, the object detection unit 210 outputs a rectangular area including the election poster (an area surrounded by a dotted line in FIG. 13). When the image includes a plurality of objects to be detected, a plurality of estimated areas may be outputted.

Technical Effect

Next, a technical effect obtained by the object detection system 20 according to the fifth example embodiment will be described.

As described in FIG. 11 to FIG. 13, in the object detection system 20 according to the fifth example embodiment, when an image is inputted, an area including the object that is a detection target is outputted as the estimation area. Here, in particular, in the fifth example embodiment, the learning of the object detection model used by the object detection unit 210 is performed by using a proper ground truth target. Specifically, the learning is performed by using the ground truth target generated in consideration of the size of the ground truth area. Therefore, according to the object detecting system 20 in the fifth example embodiment, it is possible to detect the detection target in the image with high accuracy.

Supplementary Notes

The example embodiments described above may be further described as, but not limited to, the following Supplementary Notes.

Supplementary Note 1

A learning system described in Supplementary Note 1 is a learning system including: an area candidate generation unit that generates an area candidate that is a candidate for an area in which an object is detected from an image; a ground truth area acquisition unit that obtains information about a ground truth area including the object; and a ground truth target generation unit that generates a ground truth target used for learning of an object detection unit that detects the object from the image, on the basis of a score indicating a degree of area matching between the area candidate and the ground truth area and a size of the ground truth area.

Supplementary Note 2

A learning system described in Supplementary Note 2 is the learning system described in Supplementary Note 1, wherein the ground truth target generation unit changes a score threshold, which is set for the score, in accordance with the size of the ground truth area, and generates the ground truth target from a result of comparison between the score and the score threshold.

Supplementary Note 3

A learning system described in Supplementary Note 3 is the learning system described in Supplementary Note 2, wherein the ground truth target generation unit changes the score threshold by a random number within a range corresponding to the size of the ground truth area.

Supplementary Note 4

A learning system described in Supplementary Note 4 is the learning system described in any one of Supplementary Notes 1 to 3, wherein the ground truth target generation unit corrects the score in accordance with the size of the ground truth area.

Supplementary Note 5

A learning system described in Supplementary Note 5 is the learning system described in any one of Supplementary Notes 1 to 4, wherein the ground truth target generation unit calculates the score by moving a center position of the candidate area by a random number in accordance with the size of the ground truth area.

Supplementary Note 6

A learning system described in Supplementary Note 6 is the learning system described in any one of Supplementary Notes 1 to 5, further comprising a learning unit that performs learning of the object detection unit by using the ground truth target.

Supplementary Note 7

A learning system described in Supplementary Note 7 is the learning system described in any one of Supplementary Notes 1 to 6, wherein the object is an inappropriate display included in the image.

Supplementary Note 8

An object detection system described in Supplementary Note 8 is an object detection system including: an object detection unit that detects an object from an image; an area candidate generation unit that generates an area candidate that is a candidate for an area in which the object is detected; a ground truth area acquisition unit that obtains information about a ground truth area including the object; and a ground truth target generation unit that generates a ground truth target used for learning of the object detection unit, on the basis of a score indicating a degree of area matching between the area candidate and the ground truth area and a size of the ground truth area.

Supplementary Note 9

A learning method described in Supplementary Note 9 is a learning method including: generating an area candidate that is a candidate for an area in which an object is detected from an image; obtaining information about a ground truth area including the object; and generating a ground truth target used for learning of an object detection unit that detects the object from the image, on the basis of a score indicating a degree of area matching between the area candidate and the ground truth area and a size of the ground truth area.

Supplementary Note 10

A computer program described in Supplementary Note 10 is A computer program that operates a computer: to generate an area candidate that is a candidate for an area in which an object is detected from an image; to obtain information about a ground truth area including the object; and to generate a ground truth target used for learning of an object detection unit that detects the object from the image, on the basis of a score indicating a degree of area matching between the area candidate and the ground truth area and a size of the ground truth area.

Supplementary Note 11

A recording medium described in Supplementary Note 11 is a recording medium on which the computer program described in Supplementary Note 10 is recorded.

This disclosure is not limited to the above-described examples and is allowed to be changed, if desired, without departing from the essence or spirit of the invention which can be read from the claims and the entire specification. A learning system, an object detection system, a learning method, and a computer program with such modifications are also intended to be within the technical scope of this disclosure.

DESCRIPTION OF REFERENCE CODES

10 Learning system
11 Processor
20 Object detection system
110 Area candidate generation unit
120 Ground truth area acquisition unit
130 Ground truth target generation unit
131 Score calculation unit
132 Threshold determination unit
133 Score correction unit
140 Learning unit
210 Object detection unit

What is claimed is:

1. A learning system comprising:
at least one memory that is configured to store instructions; and
at least one first processor that is configured to execute the instructions to;
generate an area candidate that is a candidate for an area in which an object is detected from an image;
obtain information about a ground truth area including the object; and
generate a ground truth target used for learning of an object detector that detects the object from the image, on the basis of a score indicating a degree of area matching between the area candidate and the ground truth area and a size of the ground truth area,
wherein the at least one first processor that is configured to execute the instructions to:
change a score threshold, which is set for the score, in accordance with the size of the ground truth area, and
generate the ground truth target based on a result of comparison between the score and the score threshold,
wherein a range of the score threshold is higher based on the size of the ground truth area being larger, and the range of the score threshold is lower based on the size of the ground truth area being smaller, and
wherein the ground truth target is a binary bitmap.

2. The learning system according to claim 1, wherein the at least one first processor that is configured to execute the instructions to change the score threshold by a random number within the range corresponding to the size of the ground truth area.

3. The learning system according to claim 1, wherein the at least one first processor that is configured to execute the instructions to correct the score in accordance with the size of the ground truth area.

4. The learning system according to claim 1, wherein the at least one first processor that is configured to execute the instructions to calculate the score by moving a center position of the candidate area by a random number in accordance with the size of the ground truth area.

5. The learning system according to claim 1, further comprising a second processor that is configured to execute instructions to perform learning of the object detection unit by using the ground truth target.

6. The learning system according to claim 1, wherein the object is an inappropriate display included in the image.

7. A learning method comprising:
generating an area candidate that is a candidate for an area in which an object is detected from an image;
obtaining information about a ground truth area including the object; and
generating a ground truth target used for learning of an object detector that detects the object from the image, on the basis of a score indicating a degree of area matching between the area candidate and the ground truth area and a size of the ground truth area,
wherein the learning method further comprises:
changing a score threshold, which is set for the score, in accordance with the size of the ground truth area, and
generating the ground truth target based on a result of comparison between the score and the score threshold,
wherein a range of the score threshold is higher based on the size of the ground truth area being larger, and the range of the score threshold is lower based on the size of the ground truth area being smaller, and
wherein the ground truth target is a binary bitmap.

8. A non-transitory recording medium on which a computer program that allows a computer to execute a learning method is recorded, the learning method comprising:
generating an area candidate that is a candidate for an area in which an object is detected from an image;
obtaining information about a ground truth area including the object; and
generating a ground truth target used for learning of an object detector that detects the object from the image, on the basis of a score indicating a degree of area matching between the area candidate and the ground truth area and a size of the ground truth area,
wherein the learning method further comprises:
changing a score threshold, which is set for the score, in accordance with the size of the ground truth area, and
generating the ground truth target based on a result of comparison between the score and the score threshold,
wherein a range of the score threshold is higher based on the size of the ground truth area being larger, and the range of the score threshold is lower based on the size of the ground truth area being smaller, and
wherein the ground truth target is a binary bitmap.

* * * * *